United States Patent [19]

Beck et al.

[11] Patent Number: 5,106,547

[45] Date of Patent: Apr. 21, 1992

[54] METHOD FOR MAKING A PRE-FORMED MILLWORK ARTICLE

[75] Inventors: Merle G. Beck; Randall S. Beck, both of Archbold, Ohio

[73] Assignee: Style-Mark, Inc., Archbold, Ohio

[21] Appl. No.: 425,416

[22] Filed: Oct. 23, 1989

Related U.S. Application Data

[62] Division of Ser. No. 282,619, Dec. 12, 1988, abandoned.

[51] Int. Cl.$^5$ .............................................. B29C 67/22
[52] U.S. Cl. .................................... 264/46.4; 264/466; 264/255; 264/309
[58] Field of Search .................... 264/255, 309, 46.4, 264/46.6; 52/309.9

[56] References Cited

U.S. PATENT DOCUMENTS

| | | | |
|---|---|---|---|
| 1,014,472 | 1/1912 | Henriques . | |
| 2,321,638 | 6/1943 | Williams . | |
| 2,454,910 | 11/1945 | Carr . | |
| 3,029,172 | 4/1962 | Glass | 428/316.6 |
| 3,141,206 | 7/1964 | Stephens | 264/46.4 |
| 3,258,889 | 7/1966 | Butcher | 264/46.4 |
| 3,389,196 | 6/1968 | Stahl . | |
| 3,507,738 | 4/1970 | Prusinski et al. | 52/309 |
| 3,605,369 | 9/1971 | Merrill et al. | 52/530 |
| 3,679,529 | 7/1972 | Prusinski et al. | 52/309 |
| 3,890,415 | 6/1975 | Hull | 264/46.4 |
| 4,028,450 | 6/1977 | Gould | 264/46.4 |
| 4,034,528 | 7/1977 | Sanders et al. | 52/311 |
| 4,037,013 | 7/1977 | Sprague | 428/317.9 |
| 4,065,899 | 1/1978 | Kirkhuff | 52/313 |
| 4,072,548 | 2/1978 | Gerson et al. | 52/309.9 |
| 4,096,011 | 6/1978 | Sanders et al. | 156/196 |
| 4,122,203 | 10/1978 | Stahl | 264/46.4 |
| 4,191,722 | 3/1980 | Gould | 264/45.5 |
| 4,209,564 | 6/1980 | Nomura et al. | 428/319.3 |
| 4,374,885 | 2/1983 | Ikeda et al. | 428/317.9 |
| 4,471,591 | 9/1984 | Jamison | 264/46.4 |
| 4,784,904 | 11/1988 | Wood et al. | 264/46.4 |

FOREIGN PATENT DOCUMENTS

| | | | |
|---|---|---|---|
| 242233 | 2/1961 | Australia | 264/46.6 |
| 3343791 | 6/1985 | Fed. Rep. of Germany | 264/46.4 |
| 57-167224 | 10/1982 | Japan | 264/46.4 |
| 1003033 | 9/1965 | United Kingdom | 264/255 |

*Primary Examiner*—Robert A. Dawson
*Assistant Examiner*—Allan R. Kuhns
*Attorney, Agent, or Firm*—Emch, Schaffer, Schaub & Porcello Co.

[57] ABSTRACT

Pre-formed millwork article for attachment to a building wherein the article has a core composed of a rigid filler material, such as an expandable polystyrene, a body portion composed of a rigid foamed material, such as polyurethane, and an exterior coating layer. The body has an inner surface which is adjacent to the core and an outer surface. The exterior coating layer is adjacent to the outer surface of the body. The coating layer can be a paint. The method for manufacturing the pre-formed millwork article consists of: (a) spraying an exterior coating layer in a mold; (b) heating the coating layer and the mold in order to cure the coating layer; (c) pouring a foamable material in the mold over the cured coating layer; (d) placing a filler material into the mold over the foamable material; (e) alllowing the foamed material to foam and harden; and (f) removing the article from the mold.

1 Claim, 3 Drawing Sheets

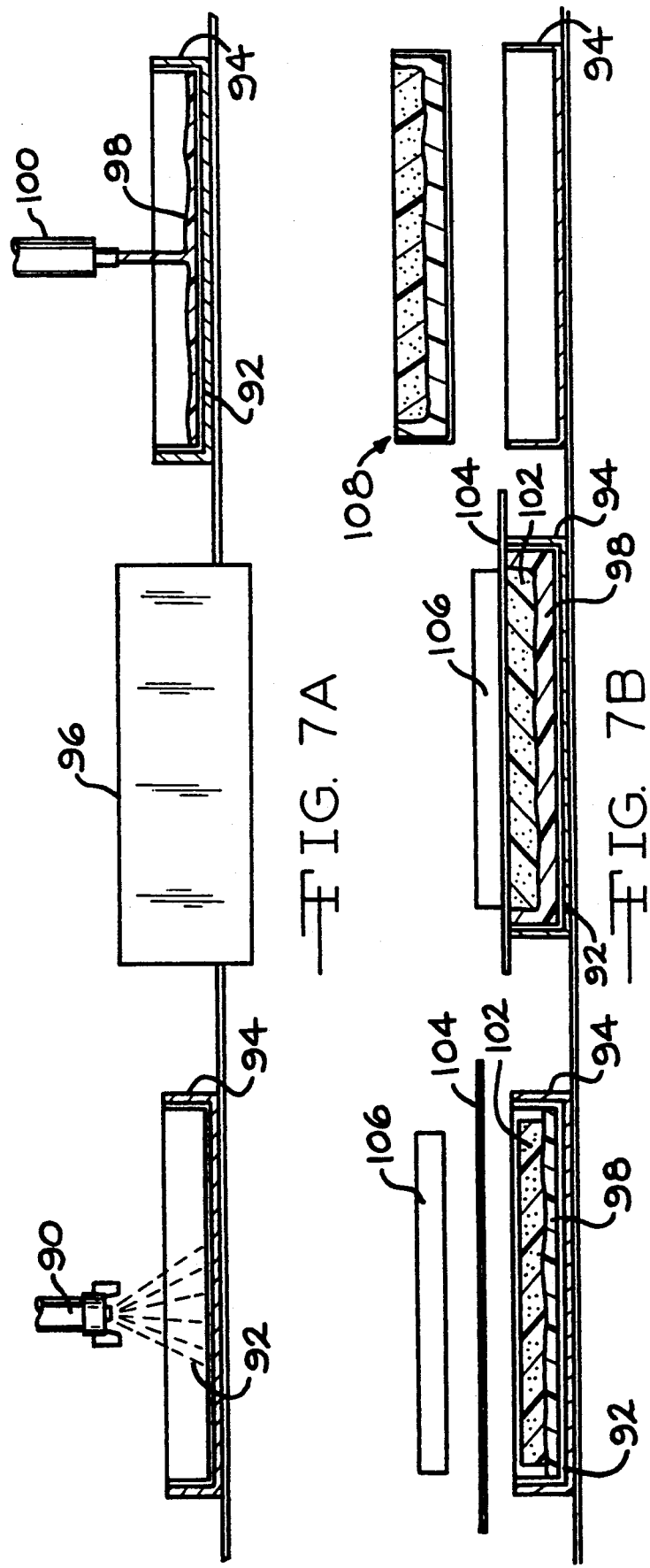

METHOD FOR MAKING A PRE-FORMED MILLWORK ARTICLE

This is a divisional of copending application Ser. No. 07/282,619 filed on Dec. 12, 1988, now abandoned.

BACKGROUND OF THE INVENTION

The present invention relates generally to pre-formed millwork articles for attachment to buildings and the like. The invention is more particularly directed to pre-formed millwork articles which are made of rigid foam materials, such as a polyurethane.

Pre-formed millwork articles are items which can be molded to simulate the appearance of wood. These items can be attached to buildings as trim pieces. Examples of these trim pieces are pediments, mantels, pilasters, headers, moldings, sidings, louvers, etc.

The use of polyurethane in the molding of pre-formed millwork articles is known in the art. It has been found that articles made of polyurethane can offer the realism of wood without the disadvantages of wood.

Polyurethane has many advantages over wood. Polyurethane has greater insulating properties than wood. Polyurethane will not decay, warp, shrink, split, crack or be infested by insects.

Polyurethane does, however, have one disadvantage: it is expensive. This results in high manufacturing costs for pre-formed millwork articles made of polyurethane.

The present invention is directed to a pre-formed millwork article made of polyurethane and a rigid filler material such as an expandable polystyrene. This invention has all of the advantages of prior art articles. However, it is substantially less expensive to manufacture.

SUMMARY OF THE INVENTION

The present invention relates to a pre-formed millwork article for attachment to a building or the like. The article has a core composed of a rigid filler material, such as an expandable polystyrene. The article further includes a body portion composed of a rigid foamed material, such as polyurethane. The body has an inner surface which is adjacent to the core. It also has an outer surface. An exterior coating layer is adjacent to the outer surface of the body. The coating layer can be paint.

The present invention is further directed to a method for manufacturing the article. The method consists of: (a) spraying an exterior coating layer in a mold; (b) heating the coating layer and the mold in order to cure the coating layer; (c) pouring a foamable material in the mold over the cured coating layer; (d) placing a rigid filler material into the mold over the foamable material; (e) allowing the foamable material to foam and harden; and (f) removing the article from the mold.

A principal object of the present invention is to provide a novel pre-formed millwork article.

An important object of the present invention is to provide a novel pre-formed millwork article which is less expensive than prior art pre-formed millwork articles.

An important object of the present invention is to provide a method for making the novel pre-formed millwork article.

Other objects and advantages of the invention will become apparent as the invention is described hereinafter in detail with reference being made to the accompanying drawings.

BRIEF DESCRIPTION OF THE DRAWINGS

FIG. 7A is a schematic representation of various method steps of the present invention; and FIG. 7B is a schematic representation of various method steps of the present invention.

DETAILED DESCRIPTION OF THE PREFERRED EMBODIMENTS

Figure 1:
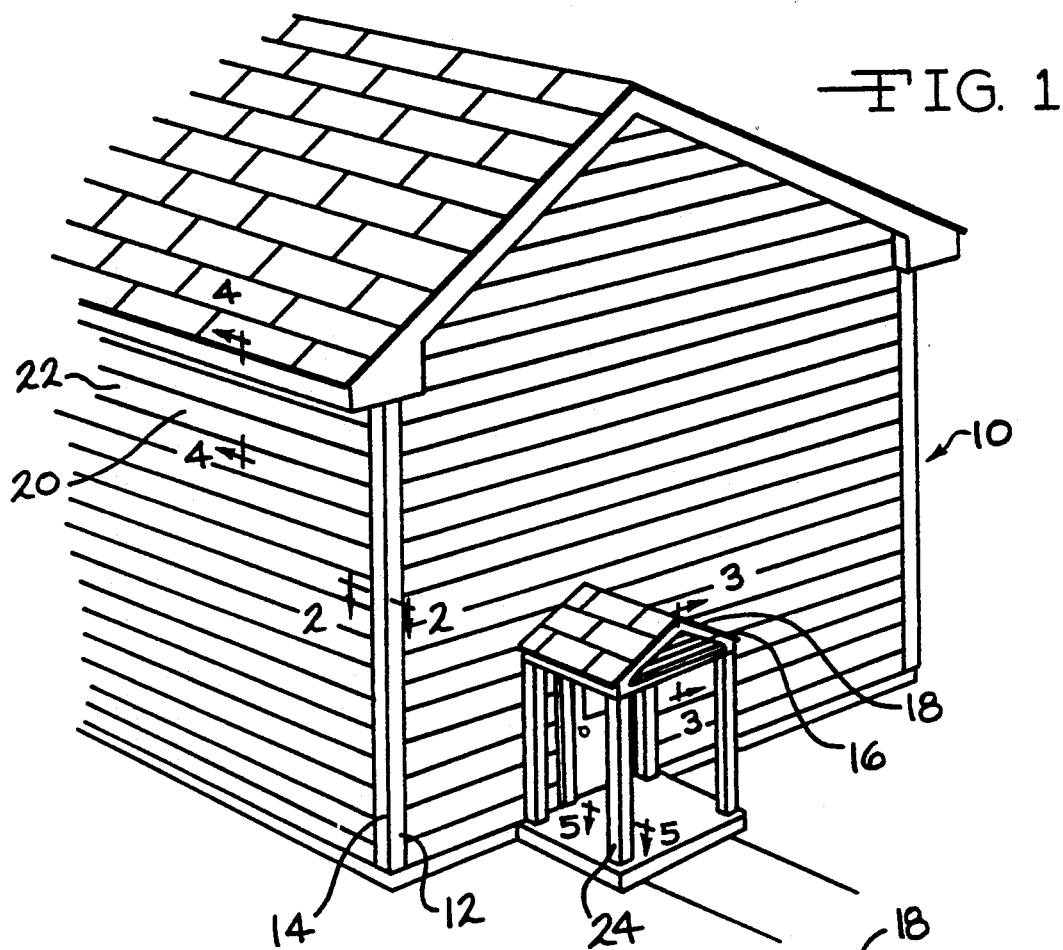
FIG. 1 is a prespective view of a building showing various embodiments of the present invention.

Referring now to the drawings, the preferred embodiments of the present invention are shown. A building 10 which has various embodiments of the present invention attached thereto is shown in FIG. 1. An "L-shaped" pre-formed millwork article 12 is attached to the corner 14 of the building 10. A pediment article 16 is attached to the portico 18 of the building 10. A siding article 20 is attached to the wall 22 of the building 10. A post article 24 is attached to the portico 18 of the building 10.

Figure 2:
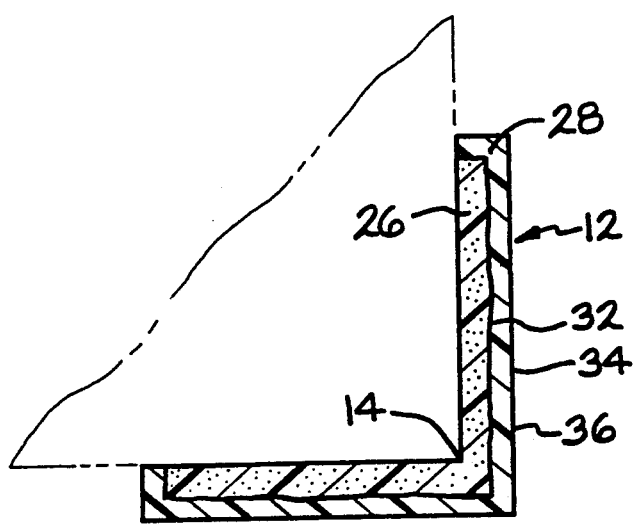
FIG. 2 is a cross-sectional view taken along line 2—2 of FIG. 1 showing an "L-shaped" corner embodiment of the present invention.

Referring to FIG. 2, the "L-shaped" corner article 12 attached to the corner 14 of the building 10 is shown in detail. The corner article 12 includes a core 26 comprised of a rigid filler material. This filler material can be an expandable polystyrene. The corner article 12 also has a body 28 comprised of a rigid foamed material. The foamed material can be polyurethane. The body 28 has an inner surface 32 and an outer surface 34. The inner surface 32 is adjacent to the core 26. An exterior coating layer 36 is adjacent to the outer surface 34 of the body 26. The coating layer 36 can be a paint.

Figure 3:
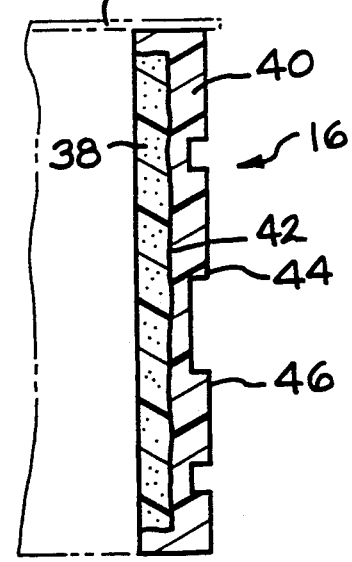
FIG. 3 is a cross-sectional view taken along line 3—3 of FIG. 1 showing a pediment embodiment of the present invention.

The pediment article 16 is shown in FIG. 3. The pediment article 16 is attached to the portico 18 of the building 10. The pediment article 16 includes a core 38 comprised of a rigid filler material, such as an expandable polystyrene. The pediment article 16 has a body 40 comprised of a rigid foamed material, such as a polyurethane. The body 40 has an inner surface 42 and an outer surface 44. The inner surface 42 is adjacent to the core 38. An exterior coating layer 46, such as a paint, is adjacent to the outer surface 44 of the body 40.

Figure 4:
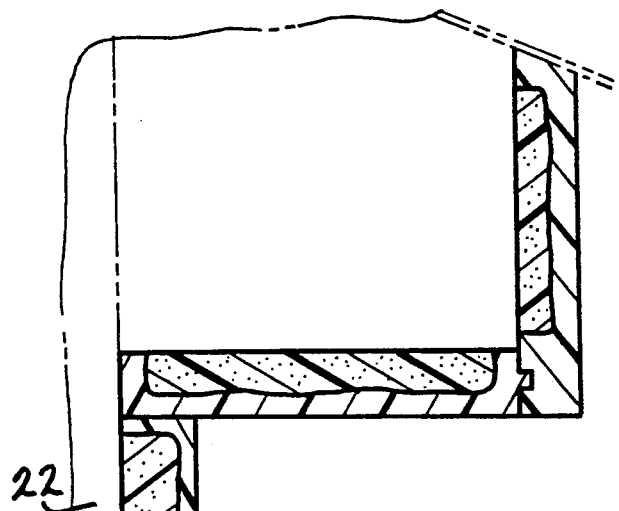
FIG. 4 is a cross-sectional view taken along line 4—4 of FIG. 1 showing a siding embodiment of the present invention.

Referring to FIG. 4, the siding article 20 attached to the wall 22 of the building 10 is shown. The siding article 20 has a core 48 and a body 50. The core can be made of a rigid filler material, such as an expandable polystyrene, and the body 50 can be made of a rigid foamed material, such as a polyurethane. The body 50 has an inner surface 52 which is adjacent to the core 48. The body 50 has an outer surface 54 which is adjacent to an exterior coating layer 56. The coating layer 56 can be a paint.

Figure 5:
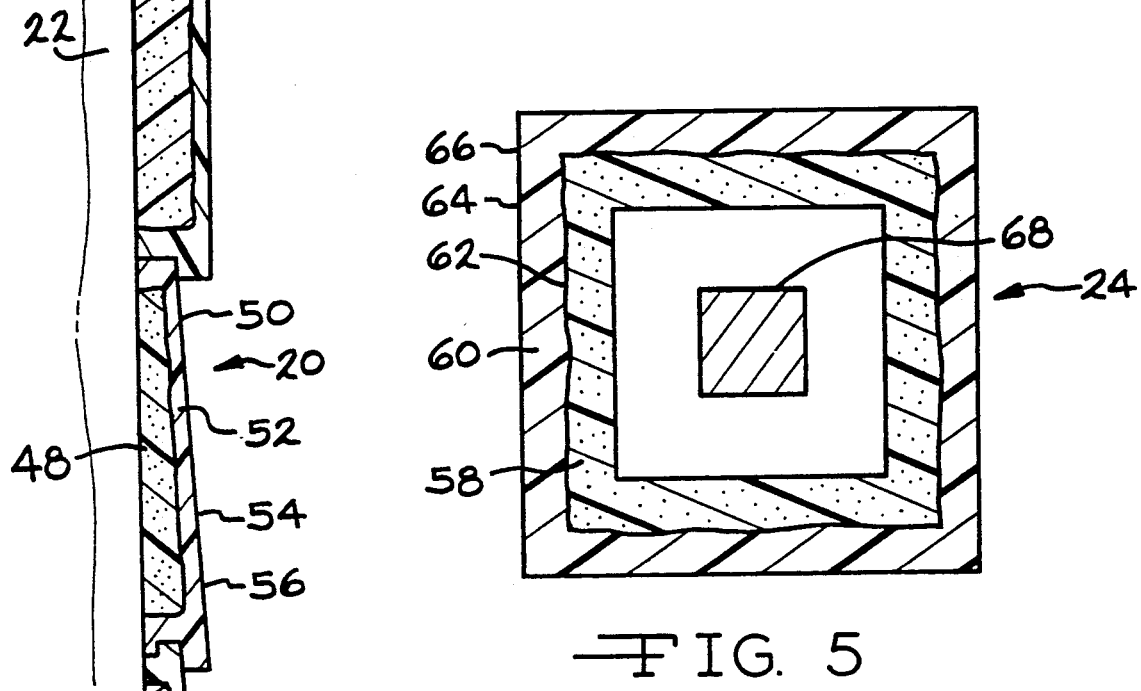
FIG. 5 is a cross-sectional view of a post embodiment of the present invention.

The post article according to the present invention is shown in FIG. 5. The post article 24 has a core 58 made of a rigid filler material, such as an expandable polystyrene. The post article 24 also has a body 60 made of a rigid foamed material, such a polyurethane. The body 60 has an inner surface 62, adjacent to the core 58. The body also has an outer layer 64. An exterior coating layer 66 is adjacent to the outer layer 64. The coating layer 66 can be a paint. A metal rod 68 can be placed in the space defined by the core 58 in order to provide support to the post article 24.

Figure 6:
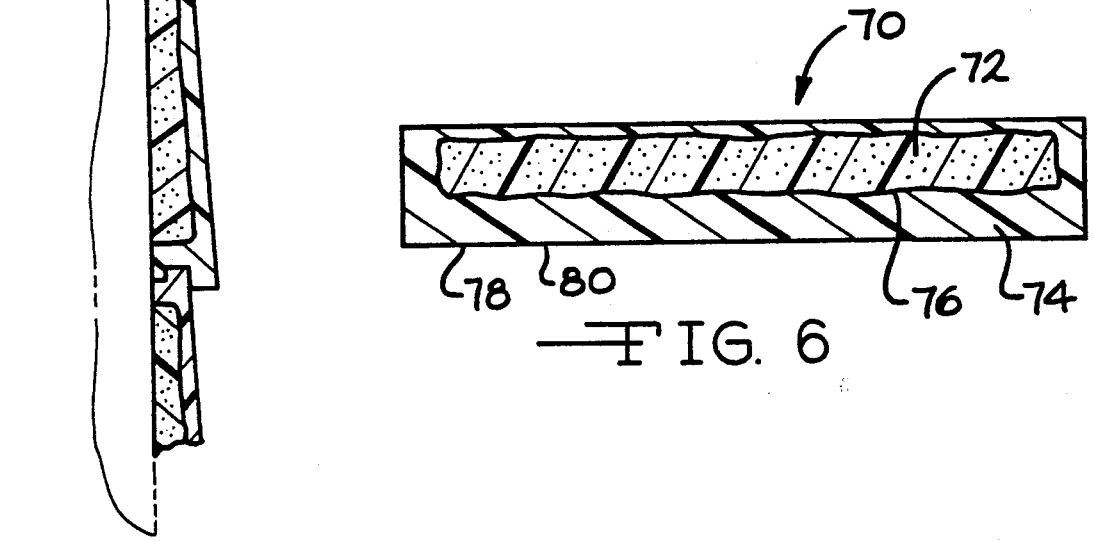
FIG. 6 is a side elevational view of an embodiment of the present invention.

An encapsulated core article is shown in FIG. 6. The article 70 has a core 72 consisting of a rigid filler material, such as an expandable polystyrene. The article 70 also has a body 74 consisting of a rigid foamed material, such as a polyurethane. The body 74 has an inner surface 76 which is adjacent to the core 72. The body 74 also has an outer surface 78 which is adjacent to an exterior coating layer 80. The coating layer 80 can be a paint.

The method steps according to the present invention are shown in FIGS. 7A and 7B. Referring to FIG. 7A, a nozzle 90 sprays an exterior coating layer 92 in a mold 94. The exterior coating layer 92 can be a paint.

The mold 94 and its contents are then placed in an oven 96 (or another suitable source of heat). The oven 96 provides heat in the range of between 75° to 150° F. The mold 94 and the exterior coating layer 92 are heated in the oven 96 for a period of time to cure the layer, usually between 1 to 10 minutes.

After the mold 94 leaves the oven 96, a layer of a foamable material 98 is placed in the mold 94 over the cured exterior coating layer 92 by a second nozzle 100. The foamable material 98 can be a polyurethane.

Referring to FIG. 7B, a rigid filler material 102 is immediately placed into the mold 94 over the layer of foamable material 98. The filler material 102 can be an expandable polystyrene. A piece of gas permeable paper 104 and a weight 106 are placed on top of the mold 94. The gas permeable paper 104 allows the gases from the foamable material 98 to escape from the mold 94 into the atmosphere. The weight 106 prevents the foamable material 98 from rising above the top of the mold 94, as it is foamed.

The mold 94 and its contents are then cooled for a period of time to allow the foamed material to harden and become rigid. The cooling time is usually between 1 and 20 minutes. The gas permeable paper 104 and weight 106 are removed from the top of the mold 94 after cooling. The completed pre-formed millwork article 108 is then removed from the mold 94.

It should be understood that many changes can be made to the pre-formed millwork article and method of making same disclosed in the drawings and still fall within the scope of the following claims.

What we claim:

1. A method of making a pre-formed millwork article comprising the steps of:
   (a) spraying a layer of paint in a mold;
   (b) heating said paint layer and said mold to cure said paint layer;
   (c) pouring a layer of foamable polyurethane in said mold over said cured paint layer;
   (d) placing rigid polystyrene material into said mold on said foamable polyurethane layer;
   (e) allowing said polyurethane to become foamed and harden; and
   (f) removing said article from said mold.

* * * * *